(12) United States Patent  
Altuwaiyan (10) Patent No.: US 9,363,674 B2
(45) Date of Patent: Jun. 7, 2016

(54) CHATTING SYSTEM AND METHOD FOR SMARTPHONES

(71) Applicant: Thamer Fuhaid Altuwaiyan, Boston, MA (US)

(72) Inventor: Thamer Fuhaid Altuwaiyan, Boston, MA (US)

( * ) Notice: Subject to any disclaimer, the term of this patent is extended or adjusted under 35 U.S.C. 154(b) by 0 days.

(21) Appl. No.: 14/536,089

(22) Filed: Nov. 7, 2014

(65) Prior Publication Data

US 2016/0135044 A1     May 12, 2016

(51) Int. Cl.
| | | |
|---|---|---|
| *H04W 4/02* | (2009.01) | |
| *H04W 4/12* | (2009.01) | |
| *H04W 4/06* | (2009.01) | |
| *H04W 4/14* | (2009.01) | |
| *H04W 12/06* | (2009.01) | |
| *H04L 29/06* | (2006.01) | |
| *H04L 12/58* | (2006.01) | |

(52) U.S. Cl.
CPC .............. *H04W 12/06* (2013.01); *H04L 51/046* (2013.01); *H04L 63/0861* (2013.01)

(58) Field of Classification Search
CPC ....... H04W 4/005; H04W 4/008; H04W 4/02; H04W 4/021; H04W 4/022; H04W 4/023; H04W 4/025; H04W 4/027; H04W 4/028; H04W 4/043; H04W 4/04; H04W 4/06; H04W 4/08; H04W 4/10; H04W 4/12; H04W 4/14; H04W 4/206
See application file for complete search history.

(56) References Cited

U.S. PATENT DOCUMENTS

| | | | |
|---|---|---|---|
| 6,981,021 B2 | 12/2005 | Takakura et al. | |
| 8,548,503 B2 | 10/2013 | Oh | |
| 8,566,029 B1* | 10/2013 | Lopatenko | ........... G08G 1/0962 701/400 |
| 2003/0037110 A1 | 2/2003 | Yamamoto | |
| 2004/0127284 A1* | 7/2004 | Walker | ..................... G07F 17/32 463/30 |
| 2005/0249153 A1* | 11/2005 | Park | ....................... H04W 24/00 370/328 |
| 2007/0185993 A1* | 8/2007 | McArdle | ................. G06Q 10/10 709/225 |
| 2009/0079547 A1* | 3/2009 | Oksanen | ................ G06Q 30/02 340/10.3 |
| 2009/0312045 A1* | 12/2009 | Miller | ................... H04W 8/186 455/519 |
| 2010/0056183 A1* | 3/2010 | Oh | ....................... H04L 12/1818 455/456.3 |
| 2010/0066803 A1* | 3/2010 | Robotka | ................. H04M 3/42 348/14.02 |
| 2010/0157291 A1* | 6/2010 | Kiesel | ................ G01N 15/1429 356/244 |
| 2010/0328033 A1* | 12/2010 | Kamei | ................. A61B 8/0875 340/5.82 |

(Continued)

FOREIGN PATENT DOCUMENTS

| | | |
|---|---|---|
| CN | 101127947 A | 2/2008 |
| CN | 103428006 A | 12/2013 |

(Continued)

OTHER PUBLICATIONS

MessageParty, http://mashable.com/2010/08/25/messageparty/.

(Continued)

*Primary Examiner* — Christopher M Brandt
*Assistant Examiner* — Ki Ha Nam
(74) *Attorney, Agent, or Firm* — Oblon, McClelland, Maier & Neustadt, L.L.P.

(57) ABSTRACT

The mobile application system and method increases the overall level of efficiency in communication. In an embodiment, a chat room may be created based on a specific location of a user. The chat room may be for a couple or a group of users, it may be of different detection diameter based on the location of certain users in different nearby locations, or their location in the same specific location. In operation, any time that a mobile application is activated and detecting a private singular or group chat room is generated by the user and different features may be applied to sent information.

18 Claims, 8 Drawing Sheets

(56) References Cited

U.S. PATENT DOCUMENTS

| | | | |
|---|---|---|---|
| 2010/0330961 A1* | 12/2010 | Rogel | G06F 21/31 455/411 |
| 2011/0052073 A1* | 3/2011 | Wallace | G06K 9/00704 382/190 |
| 2011/0256870 A1* | 10/2011 | Park | H04W 36/30 455/436 |
| 2011/0275369 A1* | 11/2011 | Bartlett | H04W 24/10 455/433 |
| 2012/0246239 A1* | 9/2012 | Rehmann | G06Q 10/107 709/206 |
| 2013/0051432 A1* | 2/2013 | Hiscock | H04B 1/69 375/139 |
| 2015/0006712 A1* | 1/2015 | Khann | H04L 67/18 709/224 |

FOREIGN PATENT DOCUMENTS

| | | |
|---|---|---|
| KR | 1340206 B1 | 12/2013 |
| KR | 2014042648 A | 4/2014 |
| WO | WO 01/93529 A1 | 12/2001 |

OTHER PUBLICATIONS

UpRoar Location Based Chat, https://play.google.com/store/apps/details?id=com.waweapp.androidapp, Apr. 13, 2013.

* cited by examiner

CHATTING SYSTEM AND METHOD FOR SMARTPHONES

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Smart devices and technology have become a major part in almost all people's lives. Whether a personal device or a family shared device or even a business shared device they all play a vital role and people have become fully dependent on them. Smart devices are used for almost everything from making a simple phone call to a high tech conference call, including all social media and useful applications. However, a good number of mobile/smart device communication applications only provide constant coverage and detection, and often includes being simultaneously detectable in other locations that happen to be located within the geographic diameter covered/detected by the smart device.

Generally, most people use multiple mobile applications for chatting/communicating with other people for example; providing a mobile application that includes all aspects of communication will help them achieve everything in an organized and timely manner. This is not only convenient but also can save a lot of trouble, as a person may choose what to send, where, and how.

SUMMARY

The mobile application system and method increases the overall level of efficiency in communication. In an embodiment, a chat room may be created based on a specific location of a user. The chat room may be for a couple or a group of users, it may be of different detection diameter based on the location of certain users in different nearby locations, or their location in the same specific location. In operation, any time that a mobile application is activated, the application detects a private singular chat room or group chat room generated by the user and different features may be applied to sent information.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Referring now to the drawings, wherein like reference numerals designate identical or corresponding parts throughout the several views.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Figure 1A:
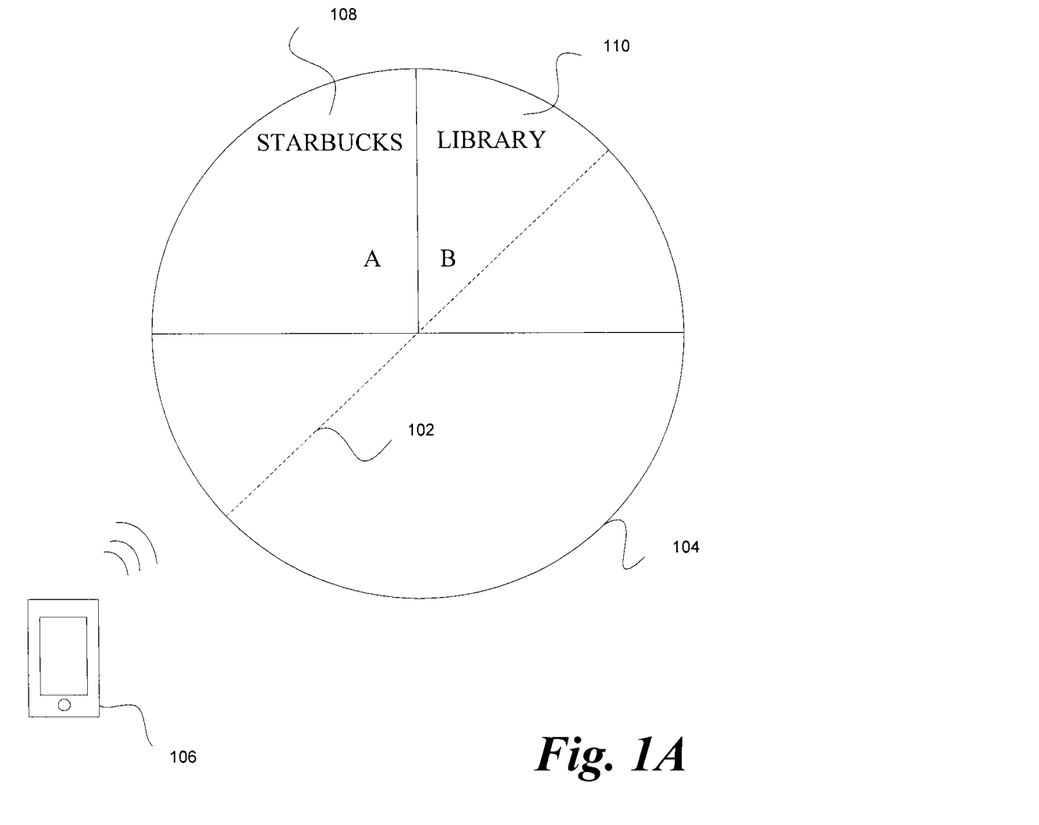
FIG. 1A is a schematic illustrating a diameter of a geographical area detected by a smart phone according to one example.

FIG. 1 is a schematic illustrating a diameter 102 of a geographical area 104 (or near-field communication range) detected by a smart phone 106. The detectable geographical area 104 may include multiple specific locations such as STARBUCKS 108 and a library 110. STARBUCKS 108, has user "A" located therein, while library 110 has user "B" located therein. User A and B are within the same detectable geographical area 104, but are within different mutually exclusive specific locations 108 and 110 respectively in area 104. "Specific location" in this content means a descriptor of a region having a recognized name, such as a store name, a classroom number, etc. Accordingly, in one embodiment that will be further described in later figures, users "A" and "B" may not start a joined chat room even though they share the same geographical area 104, because they are located in two different specific locations, albeit both within a common wireless coverage range. The diameter (or other specific metric(s) for defining a space) may be set by signal strength relative to a predetermined threshold, such as to a transmission beacon in the desired location.

The smart phone may use different ways to determine its location. Some of these ways are via Wi-Fi, Bluetooth beacons or via similar suitable techniques. In one embodiment the smartphone may use RSSI. RSSI (received signal strength indication) is the most common way of Wi-Fi to determine a location. It takes the smartphone detected signals from nearby access points and refers them to a database of Wi-Fi networks.

The database then provides information about the location of each uniquely identified access point, and depending on the strength of the signal the RSSI determines the location of a smartphone down to tens of meters.

Figure 1B:
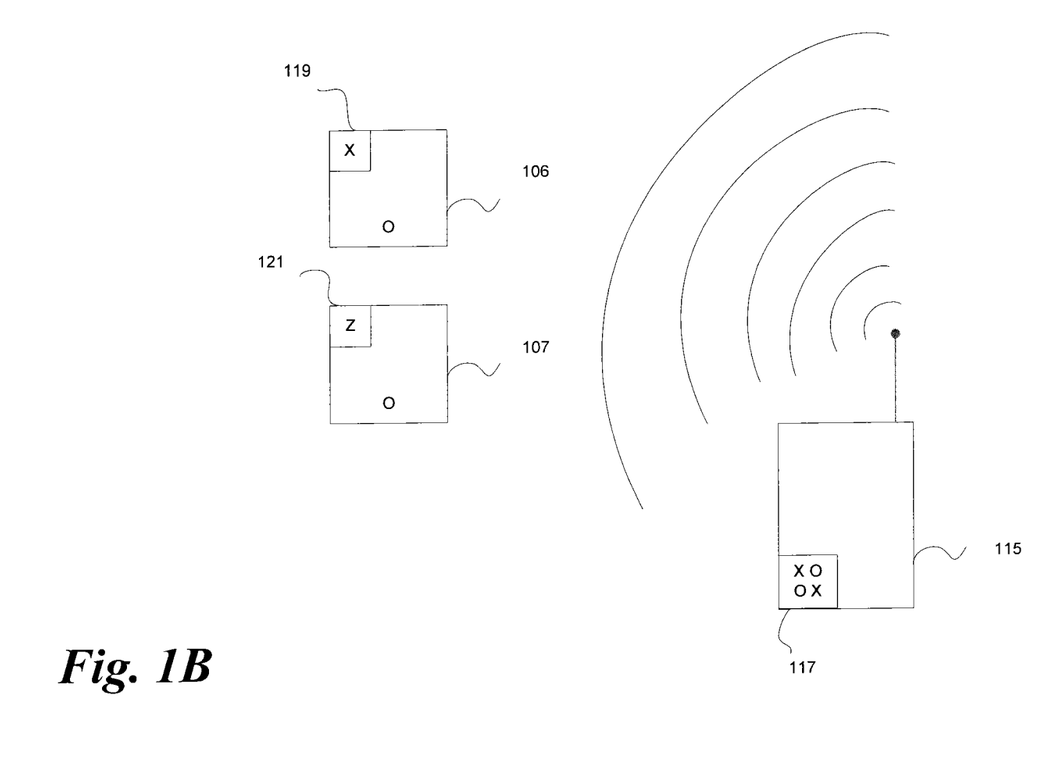
FIG. 1B is a schematic illustrating how two different may self-identify and cooperate according to one example.

FIG. 1B is a figure that shows how two different smart phones 106 and 107 may self-identify and cooperate at the specific location. In particular, smart phone 106 identifies itself being located within a specific location such as STARBUCKS A 108 (FIG. 1A). Initially smart phone 106 identifies this location by way of Wi-Fi, Bluetooth beacons, or GPS. However, that may be insufficient to avoid actually identifying a presence of a smart phone 106 in the specific location of STARBUCKS 108. In order to further confirm that smart phone 106 is in STARBUCKS 108, smart phone 106 initially receives an RF or optical beacon from an optical/RF guidepost 115. Optical/RF guidepost 115 is physically located within STARBUCKS 108 and transmits a beacon signal that can be received by smart phone 106. The beacon indicates where optical/RF guidepost 115 is located within the room, providing visual clues to assist smart phone 106 in performing an optical search for it. For example, optical/RF guidepost 115 may broadcast a beacon indicating that its position is in a corner of the room near the ceiling. Smart phone 106, once receiving the beacon, and once invited to participate in a secure chatting session within STARBUCKS 108, automatically turns on the imaging device (camera) in smart phone 106 and scans for an optical match of the optical/RF guidepost 115. Included in the beacon is a description of a distinguishing characteristic 117 that is visually prominent on the optical/RF guidepost 115. The smart phone 106 performs image recognition on the distinguishing feature 117 to confirm a match. When a match is confirmed, smart phone 106 broadcasts a confirmation identification to a chat coordinator that then includes smart phone 106 into the chat session.

Optionally, smart phone 106 itself broadcasts a description of optically distinguishing feature 119 that is automatically viewed by the smart phone 107, which in this example is the chat room coordinator, such that smart phone 106 is not invited into the chat session until smart phone 107 identifies distinguishing characteristics 119 as being accurately reported and accepted by smart phone 107 into the chat session. Similarly, smart phone 107 includes distinguishing feature 121, which again may be used as an optical beacon by the optical/RF guidepost 115 and smart phone 106 for collaborating smart phone 107 within the specific location of the STARBUCKS 108.

While the above example describes smart phone 106 as having distinguishing feature 119 and smart phone 107 as having optically distinct feature 121, the respective smart phones 106 and 107 may broadcast an image of the user that the user took of himself or herself (a selfie) so that the chat room coordinator may optically verify that the user of the particular smart phone is in fact the user invited into the chat session. Furthermore, the distinguishing feature 119 and 121 may be personal characteristics of the user such as height, weight, gender, hair color, eyeglasses, tattoos, or other distinguishing features that distinguish the user from another user such that an optical match of the user to a predefined entry in a database will collaborate the presence of the user in the specific location, which in this instance is STARBUCKS 108.

Figure 2:
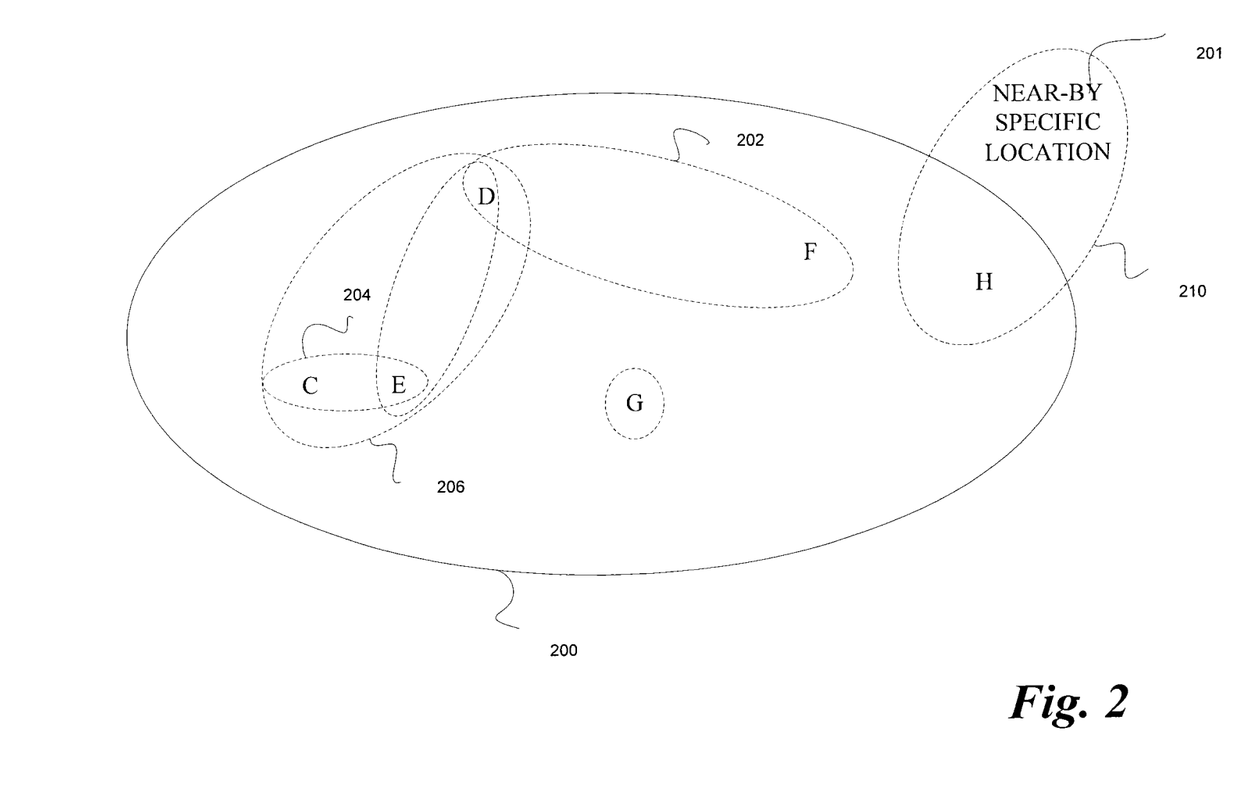
FIG. 2 is a schematic illustrating different chat rooms in a single specific location and in a nearby specific location according to one example.

FIG. 2 is a schematic illustrating different chat rooms in a single specific location 200 and in a nearby specific location 201. In one embodiment, users in the same specific location, such as specific location 200 in this example, may start a single and/or multiple chat rooms, with a single and/or multiple users. The different alphabet letters represent different users in this example. User F in only one chat room 202 with only one other user D. Users D and E are part of multiple chat rooms; two are single chat rooms with only one other user, and one group chat room with multiple users, in this case chat room 206. User C is part of two chat rooms, one of which is with a single user; chat room 204, and the other is a group chat room; including two other users, chat room 206. User G is in a solitude chat room 208. User G is not involved in any chat rooms, and that may be because user G is not detectable, or simply has not started or responded to any chat rooms. Moreover, user H is in a wide range chat room 210 and that may be because user H has chosen (via location accessibility options in the smartphone) to be detectable by a detection diameter that is larger than the diameter of the current specific location 200.

User H may not be uniquely identified as being located with a specific location, but may be located in a nearby specific location 201. If in fact user H is located in a nearby specific location 201, user H would not be invited into the chat session by the session coordinator. Validation of the presence of user H within the nearby specific location 201 (indicating that user H would not be invited into other chat sessions in region 200) would be evident because no visual indication of user H's presence within the specific location could be found. On the other hand, if user H is located within visual contact of the different users in a specific location or through a particular exchange of a unique RF tag, then user H would be eligible for participating in a chat session.

Figure 3:
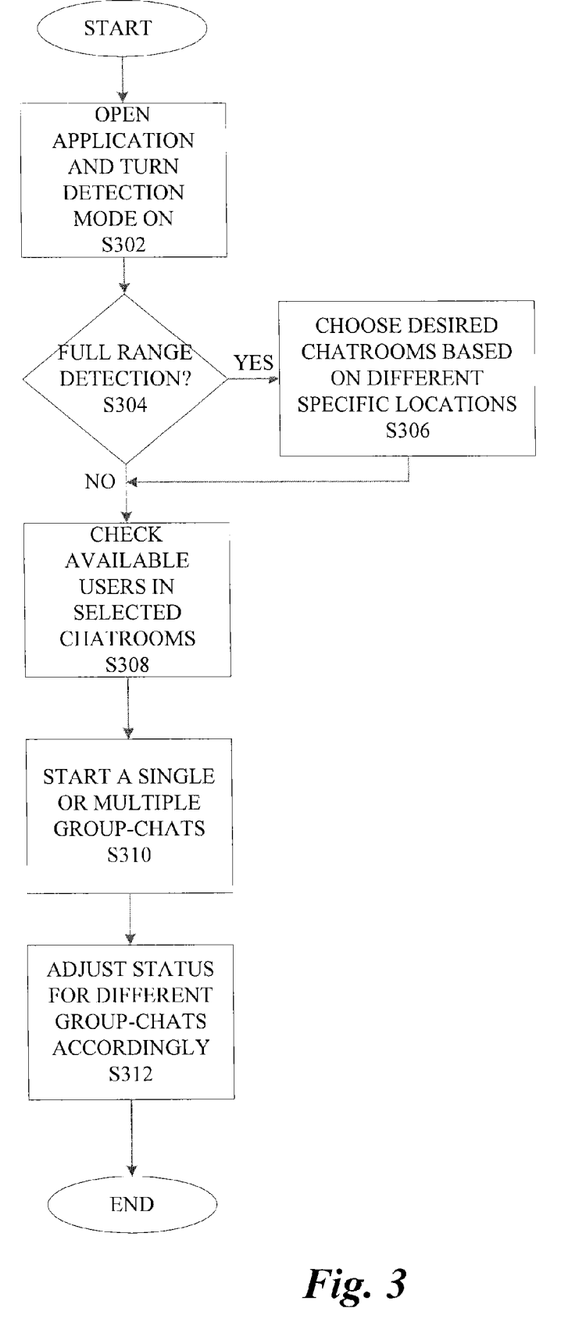
FIG. 3 is a flowchart illustrating a process of selecting a detection diameter according to one example.

FIG. 3 is a flowchart illustrating a process of selecting a detection diameter. The process begins at step S302 which is a waiting stage until the application is opened and a detection mode is turned on, the process then proceeds to step S304, where the system checks if the user wants a full range detection diameter if yes, the system allows the user to start different chat rooms in different specific locations at step S306. However, if no then the system limits the detection diameter to cover one selected/chosen specific location and checks for available users at that specific location at step S308. At step S310 the system allows the user to start a single or multiple chat groups that fall within the diameter that was predetermined at step S304. After the user has started chat groups the system allows the user to adjust status to show for example "available", "busy", "tired" or "away" accordingly at step S312.

The diameter of a geographical area may be determined in various ways. In one embodiment, when a user walks into a certain location, a transponder provides the user with a code that enables the user to chat with other users present in that same location. However, only people present in that specific location are assigned a code, this excludes any individual that is not within the diameter of that specific geographical location. The code according to this embodiment may be allocated to a user via a near-field communication such as when the user walks through a security sensor at an entrance of a specific location (e.g. such as at a library).

In particular, the code would not only be a unique code to help identify the user within the specific location, but would also compel the smart phone assigned that code to broadcast that code in a particular chirp sequence (repetition pattern) associated with a known chirp parameter set by the chat coordinator. In particular, the chat coordinator may establish a particular chirp pattern (such as a repetition cycle of between one chirp per second to one chirp per five seconds) so that the user of the cell phone may have an attribute for its broadcast that is unique to the chat session for the specific location. A user outside of the specific location would not be provided with the code or the chirp sequence that would identify that particular cell phone being located within the specific location. If at any time a particular user in the chat session is questioned by the chat coordinator, the smart phone for the chat coordinator can interrogate the chat user to replicate the code initially issued to the smart phone. Not only is the code a specific transmitted RF sequence, but also a particular signature pattern for the RF signal that is a parameter set by the chat coordinator. Once again, an example is an on/off duty cycle period (such as between a duty cycle of 1% to 50%).

Accordingly, in one embodiment this may be achieved via Bluetooth beacons. They may be used to determine very specific locations in a specific area, by sending out/transmitting signals. This is done by placing a plurality of beacons every few meters in a specific area such as a library; this will allow the beacons to communicate with any mobile device equipped with Bluetooth. This system can use these transmitted signals to determine locations within a 10 centimeters range.

In another embodiment the system allows the user to start multiple chat groups and adjust different statuses for different groups as needed.

Figure 4:
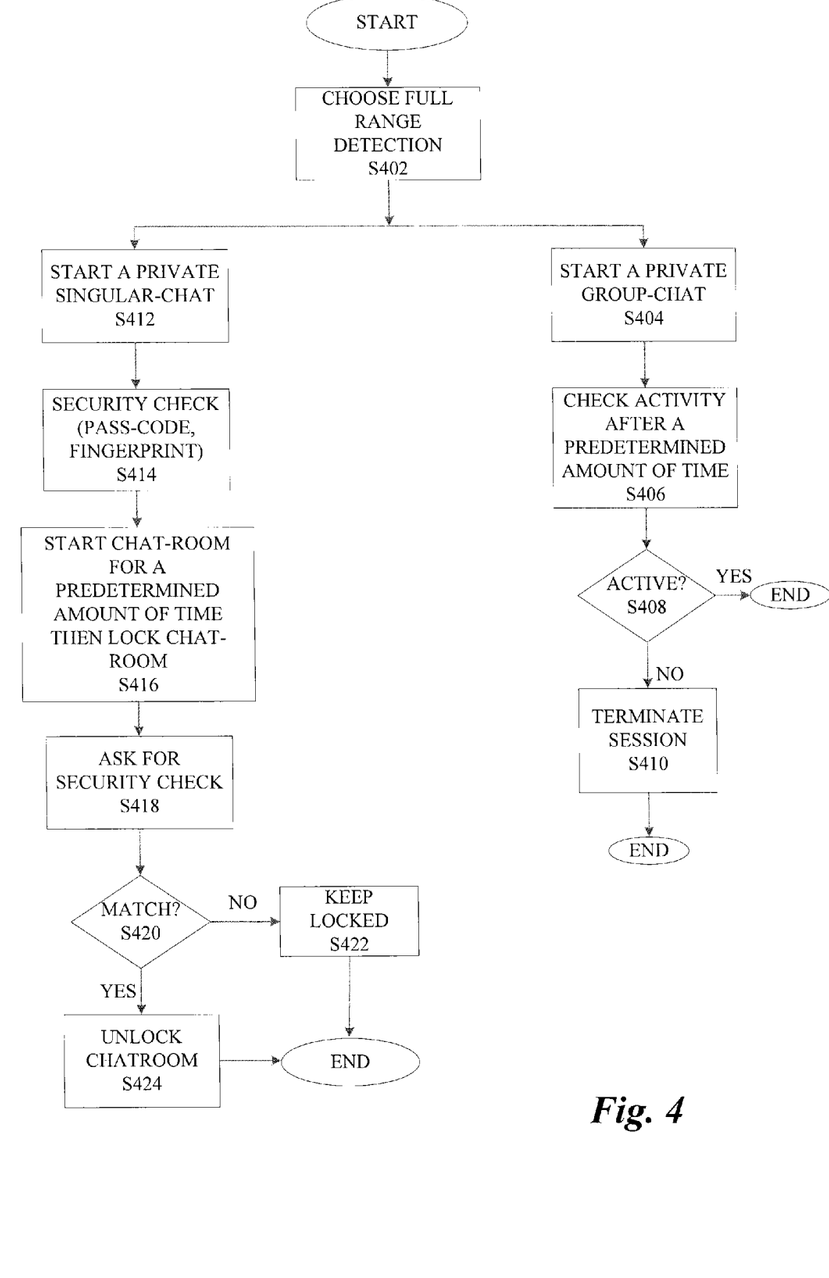
FIG. 4 is a flowchart illustrating a process of starting a secured private singular or group-chat according to one example.

FIG. 4 is a flowchart illustrating a process of starting a secured private singular or group-chat. The process begins at step S402 where a user chooses full range detection diameter (or perimeter), the process then proceeds to either step S404 or step S412 depending on the choice of the user. If the user chooses to start a private group chat at step S404, then the process proceeds to step S406, where the system checks if the group chat is active after a predetermined amount of time. At step S408 the system proceeds to step S410 if the group chat is not active, where the system terminates the group chat session. However, if the user chooses to start a private singular chat (a chat session with only one person) the process goes through step S412 and to S414 to set a security passcode, the security passcode may be a password, a sound, a movement, a fingerprint, a picture or any other passcode. At step S416 the process proceeds to start a chat room and activate it for a predetermined amount of time before locking it. Once the chat room is locked the process proceeds to step S418, where the system requests a security passcode/check to unlock the chat session. At step S420, the system checks if the inputted passcode matches the predetermined passcode form step S414. If the passcodes match then the system proceeds to step S424 where is unlocks the chat session/room. If not, then process proceeds to step S422, where the system keeps the chat session locked.

Figure 5:
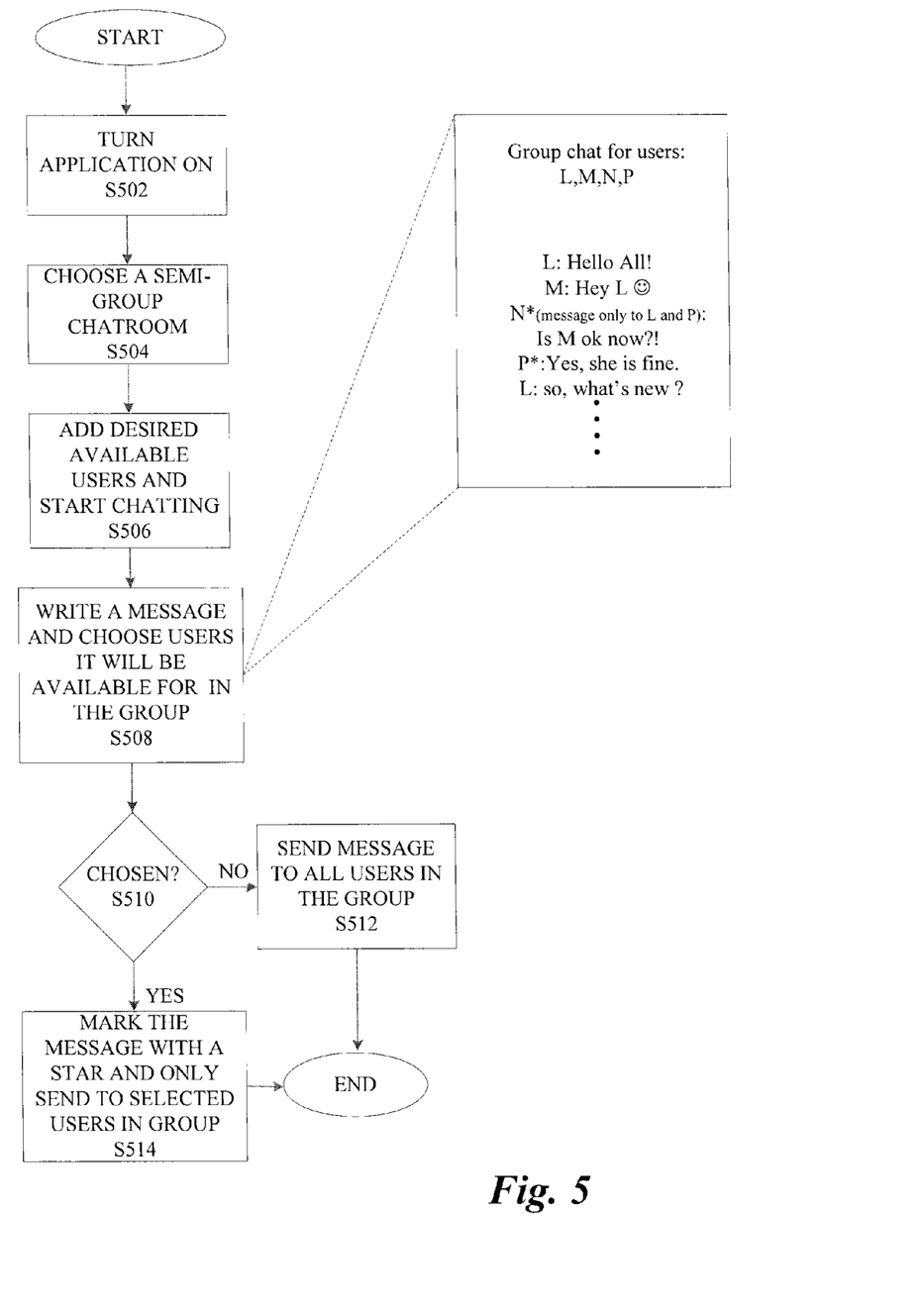
FIG. 5 is a flowchart illustrating a process of hiding a message from selected users in a group chat according to one example.

FIG. 5 is a flowchart illustrating a process of hiding a message from selected users in a group chat. The process begins at step S502 which is a waiting stage, where the system waits until the application is turned on/activated. The process then proceeds to step S504, where the user may choose to start a semi group chat room (a chat room with multiple users, yet allows selective use of who receives the message). Once the selective group chat room is selected, the process proceeds to step S506 where the user adds available users within the predetermined detection diameter and start a chat room, the process then proceeds to step S508, where the user can select a number of the users that are included in the selective group chat (not all users) to receive a message, yet have it be hidden from the rest of the users in the group.

At step S510 the system checks if the user chose users from the group to receive a selective message, if yes the process proceeds to step S514 where the system marks the selective message with a star and brackets including the chosen users (as will be explained in the following example, and as shown in the exemplary chat window described in FIG. 5). However, if not the process will proceed to step S512, where the system will continue to send the message to all users included in the chat room.

For example: if users L, M, N and P are in a selective group chat room and user N decides to send a message only to users L and P in the same chat room and hide it from user M. The system will mark the selective message with a star and small brackets including the users that are supposed to receive the message. The system will allow any user in a selective message to continue sending messages to the whole group at any time. In another embodiment, the system will also double check to make sure the same users are the ones included in the back and forth selective messaging.

In another embodiment the smartphone may use wireless fingerprinting, which uses profiles of given places based on Wi-Fi signals detected therein. This embodiment may be enabled if a specific location is visited repeatedly; because the fingerprint may be created and stored in memory the first time the user visits a specific location. Fingerprinting can determine the location of a smartphone within just a few meters.

Furthermore, the mobile application may be programmed to include and/or remember geographic dimensions or a fingerprint of a specific geographic location and its diameter. This will enable determining which users get to be part of a certain chat room in a specific location based on the predetermined/remembered dimension and/or fingerprint of that specific location. For example, if a user tries to access certain chat rooms within a specific location without being present in that same specific location then the mobile application will not enable that action. The geographic dimensions/fingerprints may be shared from an already authenticated user to another user that is trying to access/join a chat room if that person is known to the authenticated user; meaning if a person at a library is already in a chat room with a group of other users at the same library, if a friend wants to join, any user in the chat room may share the authentication information with this friend to enable them to join that same chat room.

Figure 6:
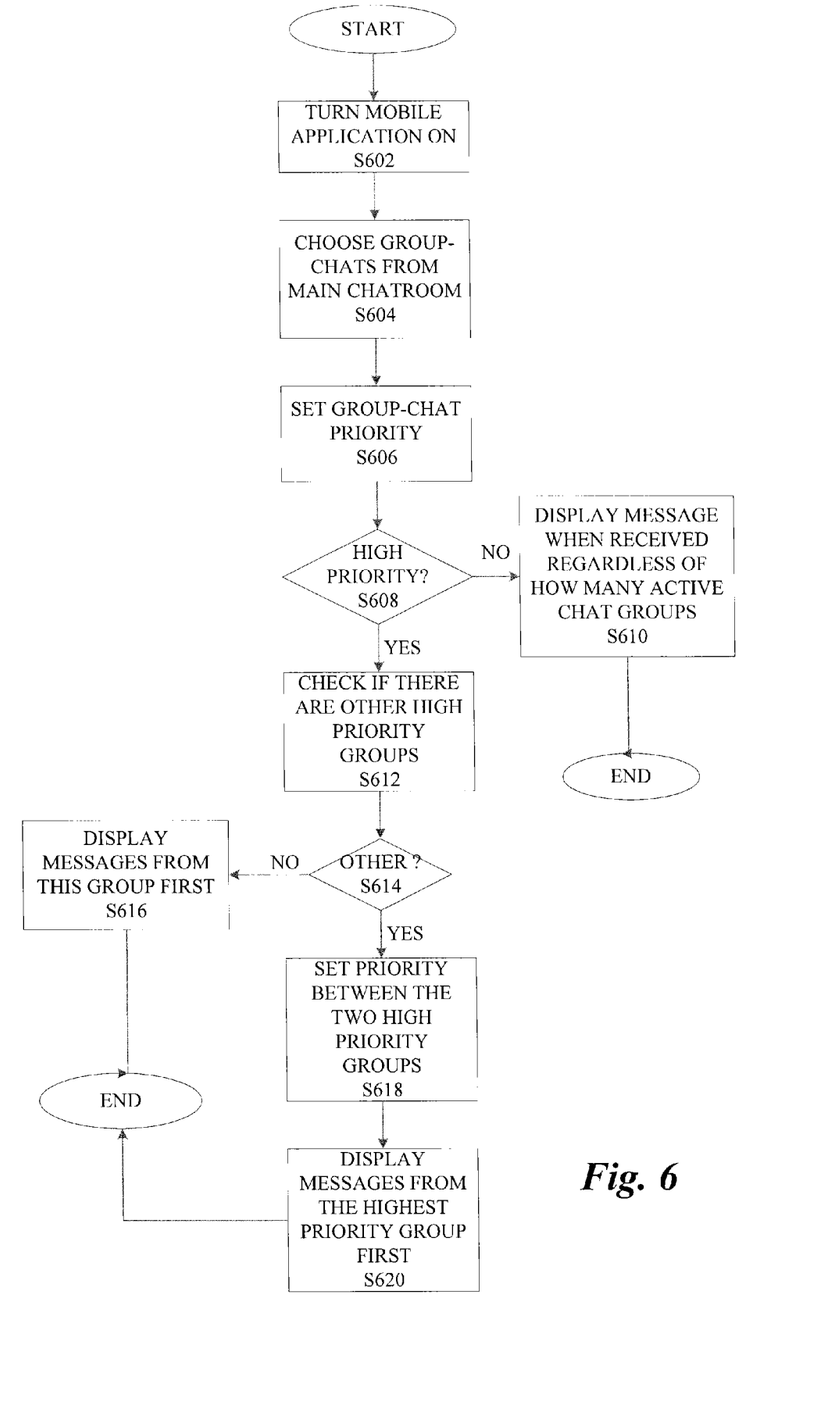
FIG. 6 is a flowchart illustrating a process of assigning priority to a certain chat room, group or singular chat according to one example.

FIG. 6 is a flowchart illustrating a process of assigning priority to a certain chat room, group or singular chat. The process begins at step S602 where the application is activated/turned on, the process then proceeds to step S604 where the user chooses different group chats by selecting users from the main chat room. At step S606, the user is requested to set a priority status to the chosen group chats, and at step S608 the system check whether the set priority for the group is high or not. If the set priority is not high then the process proceeds to step S610 where the system displays messages from this group when received, based on a first received, first displayed manner, regardless of how many chat groups are active. However, if it is set to high priority, then the process checks for any other previously set high priority chat groups at step S612. At step S614, if no other high priority chat groups are available, the process proceeds to step S616 where the system displays messages received from the current group before any other messages received from any other groups. However, if yes then the process proceeds to step S618 where the user is requested to set priority between the two high priority groups. At step S620 the system displays the messages from the highest to lowest priority accordingly.

Next, a hardware description describing the smart device according to exemplary embodiments is described with reference to FIG. 7.

Figure 7:
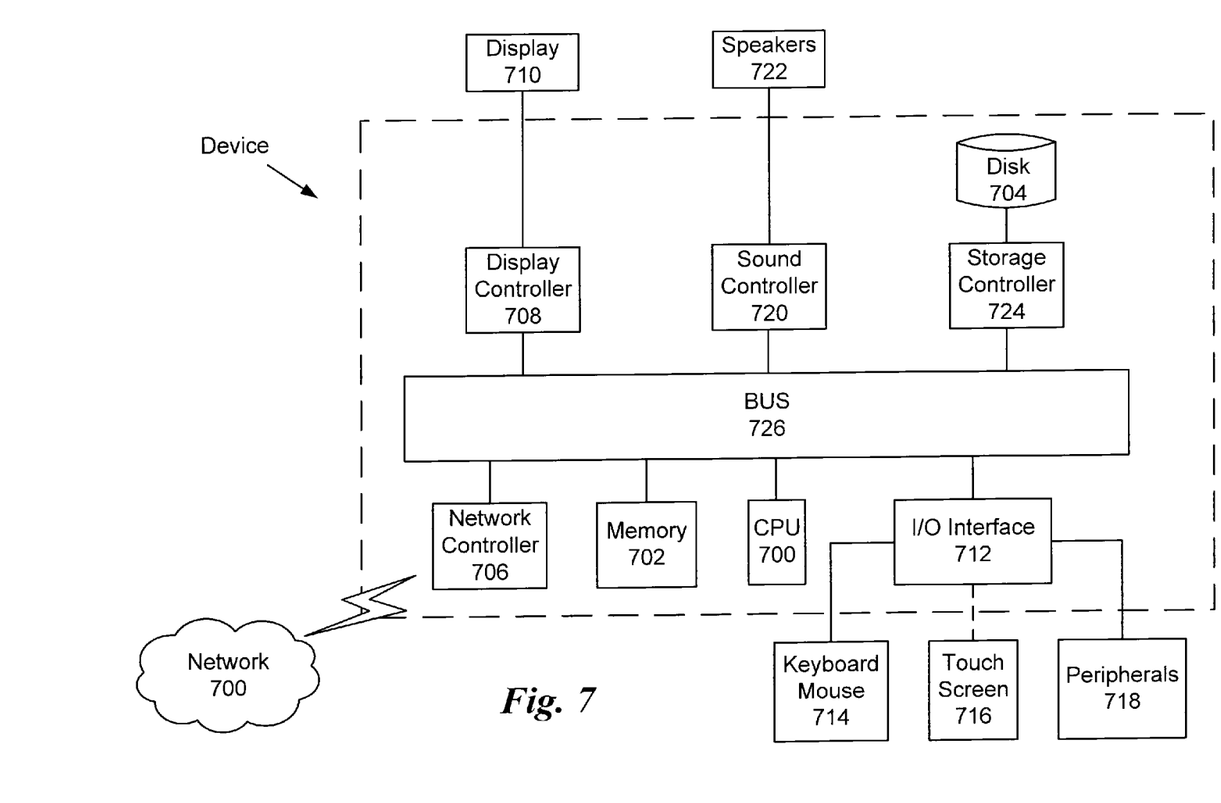
FIG. 7 illustrates an exemplary hardware configuration of a smart device according to one example.

In FIG. 7, the smart device includes a CPU 704 which performs the processes described above. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server communicates, such as another server or computer.

Further, the above-noted processes may be provided as a utility application, background daemon, or component of an operating, or combination thereof, executing in conjunction with CPU 704 and an operating such as Microsoft Windows 8, UNIX, Solaris, LINUX, Apple MAC-OS and other systems known to those skilled in the art.

CPU 704 may be a Xenon or Core processor from Intel of America or an Opteron processor from AMD of America, or may be other processor types that would be recognized by one of ordinary skill in the art. Alternatively, the CPU 704 may be implemented on an FPGA, ASIC, PLD or using discrete logic circuits, as one of ordinary skill in the art would recognize. Further, CPU 704 may be implemented as multiple processors cooperatively working in parallel to perform the instructions of the inventive processes described above.

The smart device in FIG. 7 also includes a network controller 706, such as an Intel Ethernet PRO network interface card from Intel Corporation of America, for interfacing with network 700. As can be appreciated, the network 700 can be a public network, such as the Internet, or a private network such as an LAN or WAN network, or any combination thereof and can also include PSTN or ISDN sub-networks. The network 700 can also be wired, such as an Ethernet network, or can be wireless such as a cellular network including EDGE, 3G and 4G wireless cellular systems. The wireless network can also be WiFi, Bluetooth, or any other wireless form of communication that is known.

The smart device further includes a display controller 708, such as a NVIDIA GeForce GTX or Quadro graphics adaptor from NVIDIA Corporation of America for interfacing with display 710, such as a Hewlett Packard HPL2446w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard A sound controller 720 is also provided in the smart device, such as Sound Blaster X-Fi Titanium from Creative, to interface with emitter 722 thereby providing sounds, vibrations, electric shock light and/or music. The emitter 722 can also be used to accept dictated words as commands for controlling the smart device system server.

The general purpose storage controller 724 connects the storage medium disk 704 with communication bus 726, which may be an ISA, EISA, VESA, PCI, or similar, for interconnecting all of the components of the smart device system server. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present invention are possible in light of the above teachings. It is therefore to be understood that within the scope of the appended claims, the invention may be practiced otherwise than as specifically described herein. Peripheral Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A device configured to execute a mobile application for matching devices in a specific chat room in a specific location, the device comprising:
   an imaging device;
   circuitry configured by execution of the mobile application to
      divide a predetermined direct RF coverage range of a geographic area into a specific location in which chat communications are approved and another location in which chat communications are unauthorized by a chat coordinator device;
      assign a tag or code to authorize electronic chat devices in the specific location to participate in a chat session established by the chat coordinator device, the tag or code corresponding to the specific location;
      interrogate a requesting device for the tag or code, and compare the tag or code with a predetermined tag or code corresponding to the specific location of the geographic area to determine whether there is a code match, and identify the requesting device as an unauthorized user if there is not a code match and in response to being an unauthorized user preventing chat communications in the specific location, and in response to a code match, checking for an optical match by the requesting device and report a result of the optical match to the circuitry; and
      grant access to the chat communications to the requesting device when the result of the optical match is confirmed by the circuitry,
   wherein
      the circuitry is further configured to receive an RF and/or an optical beacon from a guidepost that is located in the specific location to verify that the device is located within the specific location,
      the guidepost contains distinguishing features, and
      the circuitry confirms the optical match via the imaging device by performing image recognition of the distinguishing features.

2. The device according to claim 1, wherein the circuitry is further configured to verify the location of the device by providing visual clues to perform an optical search to confirm the optical match.

3. The device according to claim 1, wherein the circuitry is further configured to broadcast a confirmation identification when the optical match is confirmed.

4. The device according to claim 1, wherein:
the circuitry is further configured to identify selective group chat rooms, that enable a user to select a number of users that is less than a total number of users in a group chat to receive a predetermined message within a same group chat room, and differentiate a selective sent message by a predetermined character and brackets including names of users selected to receive the selective sent message.

5. The device according to claim 2, wherein the circuitry is further configured to enable a device of the user to continue group chat when the user does not select specific users to reply to a selective message.

6. The device according to claim 1, wherein the circuitry is further configured to perform a signal match by checking a predetermined chirp sequence transmitted by the requesting device.

7. The device according to claim 6, wherein the chirp sequence is a repetition pattern of a predetermined pattern.

8. The device according to claim 1, wherein the circuitry is configured to check when a chat group is assigned a high priority status, if any other group has a high priority status, and adjust at least one priority status to be a higher priority status when any other group has a high priority status.

9. The device according to claim 5, wherein the circuitry controls displaying a received message with a high priority, before any other message received on the device of the user regardless of a time of receipt.

10. The device according to claim 1, wherein the circuitry is further configured to compare, in response to locking a private chat room after a predetermined amount of time has passed, a current passcode to a predetermined passcode, and unlock the private chat room, when the current passcode corresponds to the predetermined passcode.

11. A method, comprising:
executing a mobile application on a user device that matches communication devices in a specific chat room in a specific location,
dividing, via circuitry, a predetermined direct RF coverage range of a geographic area into the specific location in which chat communications are approved and another location in which chat communications are unauthorized by a chat coordinator device;
assigning, via the circuitry, a tag or code to authorize electronic chat devices in the specific location to participate in a chat session established by the chat coordinator device, the tag or code corresponding to the specific location;
interrogating, via the circuitry, a requesting device for the tag or code, and comparing the tag or code with a predetermined tag or code corresponding to the specific location of the geographic area to determine whether there is a code match, and identifying the requesting device as an unauthorized user if there is not a code match and in response to being an unauthorized user preventing chat communications in the specific location, and in response to a code match checking for an optical match by the requesting device and reporting a result; and
granting, access to the chat session to the requesting device when the result of the optical match is confirmed by the circuitry,
wherein
the circuitry is further configured to receive an RF and/or an optical beacon from a guidepost that is located in the specific location to verify that the device is located within the specific location,
the guidepost contains distinguishing features, and
the circuitry confirms the optical match via an imaging device by performing image recognition of the distinguishing features.

12. The method according to claim 11, further comprising:
determining, via the circuitry, a detection diameter based on different specific locations of different user devices.

13. The method according to claim 11, further comprising:
identifying, via the circuitry, selective group chat rooms, that enable a user to select a number of users that is less than a total number of users in a group chat to receive a predetermined message within the same group chat room, and differentiating a selective sent message by a predetermined character and brackets including names of users selected to receive the selective sent message.

14. The method according to claim 11, wherein the providing selective group chat rooms include:
enabling, via the circuitry, a device of the user to continue group chat when the user does not select specific users to reply to a selective message.

15. A non-transitory computer-readable medium having computer-readable instructions thereon which when executed by a computer cause the computer to perform a method comprising:
executing a mobile application on a user device that matches communication devices in a specific chat room in a specific location,
dividing, via circuitry, a predetermined direct RF coverage range of a geographic area into the specific location in which chat communications are approved and another location in which chat communications are unauthorized by a chat coordinator device;
assigning, via the circuitry, a tag or code to authorize electronic chat devices in the specific location to participate in a chat session established by the chat coordinator device, the tag or code corresponding to the specific location;
interrogating, via the circuitry, a requesting device for the tag or code, and comparing the tag or code with a predetermined tag or code corresponding to the specific location of the geographic area to determine whether there is a code match, and identifying the requesting device as an unauthorized user if there is not a code match and in response to being an unauthorized user preventing chat communications in the specific location, and in response to a code match checking for an optical match by the requesting device and reporting a result; and
granting, access to the chat session to the requesting device when the result of the optical match is confirmed by the circuitry,
wherein
the circuitry is further configured to receive an RF and/or an optical beacon from a guidepost that is located in the specific location to verify that the device is located within the specific location,
the guidepost contains distinguishing features, and
the circuitry confirms the optical match via an imaging device by performing image recognition of the distinguishing features.

16. The device according to claim 1, wherein
the circuitry broadcasts a description of an optically distinguishing feature of the device, and
access to the chat communications is granted based on confirmation of the distinguishing features via image recognition by the chat coordinator device.

17. The device according to claim 1, wherein
the circuitry transmits to the chat coordinator device an image of a user of the device, and
access to the chat communications is granted based on confirmation of the user via image recognition of the image by the chat coordinator device.

18. The device according to claim 17, wherein
the circuitry transmits to the chat coordinator device user information including at least one of height, weight, gender, hair color, eyeglasses, and tattoos, and
access to the chat communications is granted further based on confirmation of the user information via image recognition of the image by the chat coordinator device.

* * * * *